June 16, 1964  C. L. HURST  3,137,076
METHOD AND APPARATUS FOR ALIGNING WHEELS AND AXLES
Filed July 22, 1960  7 Sheets-Sheet 1

INVENTOR.
CHARLES L. HURST
BY

June 16, 1964 C. L. HURST 3,137,076
METHOD AND APPARATUS FOR ALIGNING WHEELS AND AXLES
Filed July 22, 1960 7 Sheets-Sheet 3

INVENTOR.
CHARLES L. HURST
BY

June 16, 1964 C. L. HURST 3,137,076
METHOD AND APPARATUS FOR ALIGNING WHEELS AND AXLES
Filed July 22, 1960 7 Sheets-Sheet 4

INVENTOR.
CHARLES L. HURST
BY

June 16, 1964 C. L. HURST 3,137,076
METHOD AND APPARATUS FOR ALIGNING WHEELS AND AXLES
Filed July 22, 1960 7 Sheets-Sheet 5

INVENTOR
CHARLES L. HURST
BY

June 16, 1964  C. L. HURST  3,137,076
METHOD AND APPARATUS FOR ALIGNING WHEELS AND AXLES
Filed July 22, 1960  7 Sheets-Sheet 6

INVENTOR.
CHARLES L. HURST
BY

June 16, 1964   C. L. HURST   3,137,076
METHOD AND APPARATUS FOR ALIGNING WHEELS AND AXLES
Filed July 22, 1960   7 Sheets-Sheet 7

INVENTOR.
CHARLES L. HURST

United States Patent Office 3,137,076
Patented June 16, 1964

3,137,076
METHOD AND APPARATUS FOR ALIGNING WHEELS AND AXLES
Charles L. Hurst, Dayton, Ohio, assignor to Manufacturers Machine Company, Dayton, Ohio, a corporation of Ohio
Filed July 22, 1960, Ser. No. 44,814
8 Claims. (Cl. 33—193)

This invention relates to an aligning device for axles and, in particular, to an aligning device for aligning the axles of trailers, and to a method of aligning trailer axles to cause the running gear of the trailer consisting of the tires, wheels, and hubs to run true.

In the operation of tractor-trailer combinations it sometimes occurs that the axle or axles at the rear end of the trailer will get out of alignment. This may occur on account of the trailer wheels striking an abutment or from the trailer body becoming bent or for other reasons. In any case, any out of alignment condition of the axle or axles of a trailer will lead to rapid tire wear which results in a big expense for the trailer owner, while at the same time a hazardous condition may be created by the trailer failing to "track." This can cause jackknifing and makes it difficult to control the trailer easily on the road, and also imposes a lateral drag on the back end of the tractor, which, in turn, causes tire wear on the tractor wheels and difficulties in handling the tractor.

Tractor wheels are generally fairly accurately aligned at the time of manufacturing the tractor, but, there has not heretofore been available a suitable device for checking the alignment of trailer axles and correcting any condition of misalignment that might be present.

The present invention has a primary objective the provision of a device for checking the alignment of trailer axles and wheels, and a method for aligning the axles and wheels.

Another object of this invention is the provision of a device for checking trailer wheel and axle alignment which can be used with substantially any type of trailer having either single axle or tandem axles and with substantially any spacing between the tandem axles.

Still another object of this invention is the provision of a device for checking the alignment of trailer wheels and axles which is so convenient to use so that it can be employed with fleets of trailers and thereby permit the trailers readily to be maintained in good operating condition.

Still another object of this invention is the provision of a trailer wheel and axle alignment checking device which will be accurate but which is of such rugged construction as substantially to eliminate maintenance and faulty operation in connection thereto.

The several objectives referred to above, as well as still other objects and advantages of the present invention will become more apparent upon reference to the following specification taken in connection with the accompanying drawings wherein.

General Arrangement

The objectives of the present invention are attained by adjusting the rear axle of the trailer with reference to a straight line extending from the king pin, by means of which the trailer is connected to a tractor, rearwardly to the center of the rear axle, so that it is perpendicular to the said reference line. When the trailer has only a single rear axle, this operation will accomplish the desired alignment and the trailer will track properly behind the king pin.

When the trailer has tandem wheels the rear axle may be adjusted with reference to the front axle after the front axle has been aligned so that the axles are parallel.

Alternatively, the rear axle, in the case of tandem trailer axles, may be adjusted so as to be perpendicular to a reference line leading backwardly from the king pin to the center of the front or rear axles.

In effecting any necessary adjustments of the axles, they are loosened somewhat, and from their connections with the supporting spring structure and adjusted to the desired position and then again clamped in place. Modern trailers have adjustable links connected with the axles at one end for effecting such adjustments, with the other end of the axle being attached to their pertaining springs in such a manner and to permit at least some angular movement in a horizontal plane to permit the adjustments to be made.

In other cases, either end of the axle can be adjusted, or the spring supports can be adjusted thereby moving the entire axle and supporting spring structure at one end of the axle. In any case, the axles are adjusted angularly in a horizontal plane to effect the desired adjustment.

According to one modification, the trailer is positioned with its rear wheels supported on V block means that are rotatable in a horizontal plane. A reference line is established from a point midway between the wheels of the trailer and the king pin that connects the trailer with the tractor. A portion of the reference line is established by a member projecting forwardly from midway between the trailer wheels and perpendicular to the transverse axis of the V block. From the outer end of this member, another member leads in a straight line to the king pin. Any angularity between the said projecting member and the member making up the remainder of the reference line is indicated by a suitable gauge connected there between.

The axle to be aligned is loosened at one end, and it is adjusted angularly in a horizontal plane. The V block on which the axle being adjusted is supported also moves with the axle and indicating means between the V block means and a stationary point can be employed for determining the amount of movement of the V block means and, therefore, the axle pertaining thereto.

Simultaneously, the said member projecting from the V block means is adjusted angularly relative to the member extending from the end thereof to the king pin so that the gauge engaged therewith will serve to indicate when the said projecting member and the member leading therefrom to the king pin are precisely in a straight line thereby showing that the axle being adjusted is exactly at right angles to the reference line which is now a continuous straight line from the king pin to a point midway between the wheels on the axle.

Where the trailer has tandem axles the aforementioned indicating means between the V block means and a stationary point can be utilized for adjusting the V block means for the rear axle into parallelism with the front V block means by adjusting the rear V block means until the indicator readings coincide.

According to another modification of the present invention, gauge block members are accurately located on the front axle and a gauge is provided that can be connected between these gauge members so as to have a portion projecting rigidly therefrom and at right angles to the axle and in the center thereof. From the front end of this projecting portion another member runs in a straight line to the trailer king pin and any angularity between the members is indicated by a suitable indicator connected therebetween. The axle is adjusted to reduce the indicator reading to zero which will show that the axle is positioned at right angles to a reference line extending from the king pin to the mid point of the axle.

Where such a trailer has tandem axles, the rear axle may be provided with similar gauge members for carrying out a similar aligning operation, or gauge devices may be employed to measure between the axles at their ends so that the rear axle can be adjusted to put both ends the same distance from the opposite ends of the front axle whereupon the rear axle is also aligned.

According to a still further modification of this invention, a gauge point is established on the trailer body rearwardly of the king pin and a frame is provided which is attached to the trailer body at said gauge point. This frame has means at its opposite ends for engagement with the trailer axle which indicate, by triangulation any misalignment of the trailer axle which can then be corrected as described above.

With this modification, the alignment of the rear axle is accomplished as described in connection with the second modification by adjusting it into parallelism with the front axle after the front axle has been properly aligned.

In the following description reference is made to engaging the trailer wheels, or the tires thereof, or the wheel hubs. It is considered that all of these elements made up the trailer running gear and it will therefore be understood that no limitation is implied by such reference. The engagement of any element of the running gear is equivalent to the engagement of any other element thereof with respect to the locating operations carried out.

Structural Arrangement

Referring now more particularly to the drawings and, with a specific reference to FIGURES 1 through 9, FIGURE 1 shows a portion of a trailer body 10 which at the front has a king pin means 12, which is diagramatically illustrated, but it will be understood to be the king pin by means of which the tractor is pivotally joined with the fifth wheel of the trailer. At its rear end the trailer has wheels 14 on an axle 16 and may also have the rear wheels 18 on the axle 20 when the trailer is provided with tandem wheels. The trailer in FIGURE 1 has its front wheels positioned on a V block member 22 and its rear wheels positioned on a V block member 24. As will be seen in FIGURE 2 V block member 22 is mounted on a center pivot post 26 on a support block 28. Similarly, V block 24 is mounted by pivot means 30 on a support block 32. The turnbuckles 27 and 29 are provided between the axles at one end and stationary points so adjustment of the turnbuckles will adjust the angularity of the axles when they are loosened at the said one end.

Figure 8:
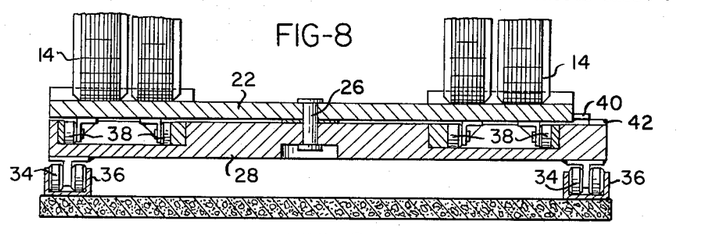
FIGURE 8 is a vertical sectional view indicated by line 8—8 on FIGURE 4 showing a swiveling block forming a part of the structure of the present invention.
Figure 9:
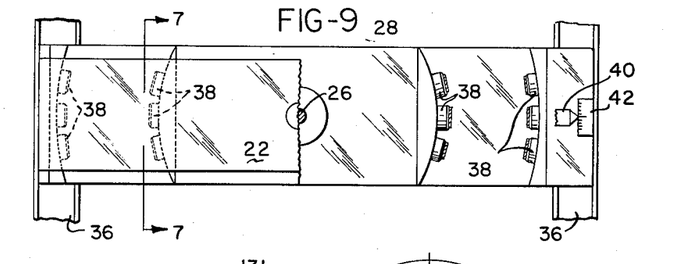
FIGURE 9 is a plan view looking down on top of one of the swiveling blocks with a portion of the block at the right side broken away to show roller supports therefor.

As will be seen in FIGURE 8, the support blocks 28 and 32 have rollers 34 at their opposite ends guided in track means 36 which will permit straight movement fore and aft of the support blocks without permitting angular movement thereof. FIGURE 8 will also show that the pivots for the V blocks are in the centers thereof and that the V blocks may have support rollers 38 therebeneath toward the outer ends for supporting the V blocks on their support blocks to permit ready angular movements of the V blocks about their respective pivot posts.

Each V block has a pointer 40 to one end that registers with scale means 42 on the pertaining support block so that the angular position of each V block on its support block can readily be determined.

Reference to FIGURE 1 through 4 will show that the front V block 22 has mounted thereon, toward the ends, the journal blocks 44 through which there extends a rod 46 which is rotatable in the journal blocks and which is also slideable axially in the journal blocks. This rod has oppositely threaded portions 48 and 50 thereon which are mounted the nuts 52 and 54 respectively that carry the arms 56 and 58, respectively. A crank 60 on the rod permits rotation thereof so that the said arms can be moved to engage the running gear of the trailer and, specifically, the insides of the tires of the wheels that are resting in the front V block 22.

Figures 4, 5, 6, 7:
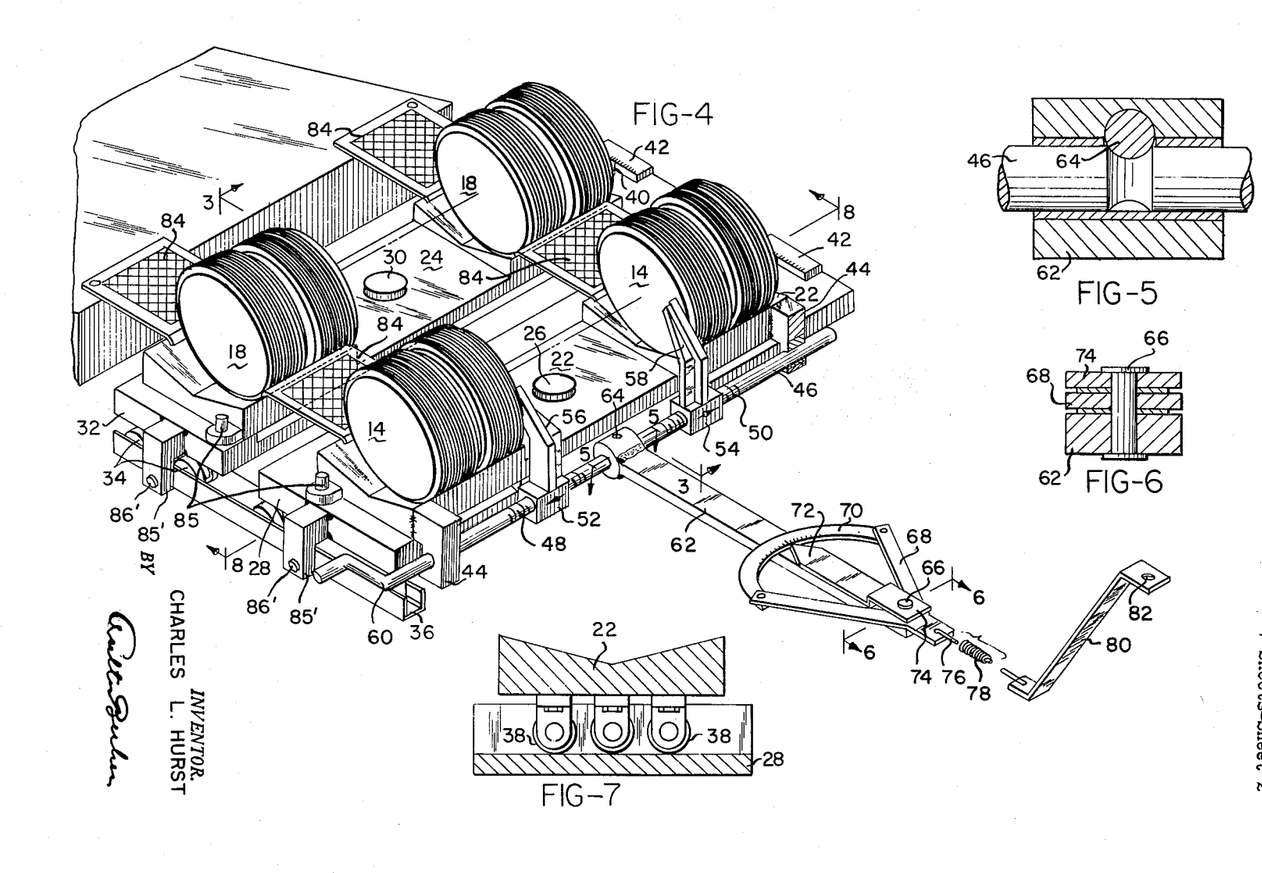
FIGURE 4 is a perspective view of the alignment device.
FIGURE 5 is a vertical sectional view indicated by line 5—5 on FIGURE 4 showing a connection between two parts of the device.
FIGURE 6 is a vertical sectional view indicated by line 6—6 on FIGURE 4 showing a connection between two parts of the alignment device.
FIGURE 7 is a sectional view indicated by line 7—7 on FIGURE 9 showing roller support means for the angularly movable V block means.

Rotatably connected to the center of rod 46 is a bar member 62 that is pinned by a pin 64 to the rod so the rod can rotate in the bar member while the bar member will be held axactly in the center of the rod and exactly midway between arms 56 and 58 at all times and exactly at right angles to the rod.

At its forward end, bar member 62 has pivot means 66 that pivotally supports a Y-shaped frame 68 that has a scale member 70 positioned between the ends of its rearwardly projecting legs which cooperates with a pointer 72 fixed to bar member 62.

Y-shaped frame 68 has a leg 74 projecting forwardly to which is attached a cable 76 having a tension spring 78 therein and being adjustable in length. At its forward end, cable 76 is connected with the lower end of an angular bar 80, the other end of which has an aperture 82 adapted for engaging the trailer king pin.

The V blocks and the supporting block and the tracks on which the supporting blocks are movable are preferably mounted in a pit so that the trailer can be driven directly over the device until the wheels are located on the V blocks. During the movement of a trailer into position, detachable track means 84 can be employed which will facilitate getting the trailer into and out of position and which can be removed so as not to interfere with the operation of the aligning device. The V blocks may be pinned in position to the support blocks by the pins 85 while the trailer is being driven into position and the pins are thereafter removed when the aligning device is to be operated.

Similarly, the support blocks can be held in position while the trailer is being drawn over the device and then released after the trailer wheels are in the proper position. Such means might take the form of the brackets 85' on the support blocks through which pins 86' can be extended for holding the support blocks against fore and aft movement while the trailer is being driven thereon. Inasmuch as the distances between the front and rear axles of different trailers will be different, the two support blocks are adjustable in the fore and aft direction relative to each other so that the wheels of both axles will be properly engaged by the respective V blocks.

*Operation of the First Embodiment*

Figure 1:
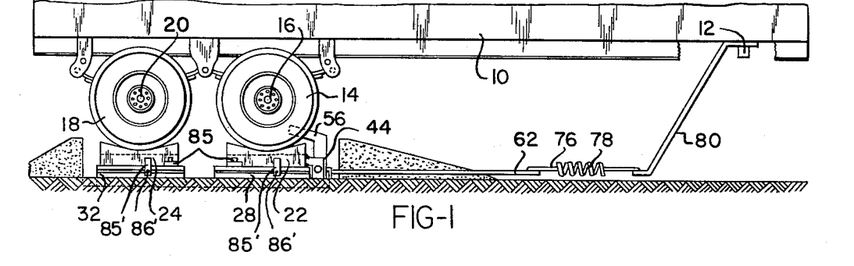
FIGURE 1 is a fragmentary side elevational view showing a portion of a trailer with the rear wheels thereof resting on a checking and alignment device according to the present invention.
Figure 2:
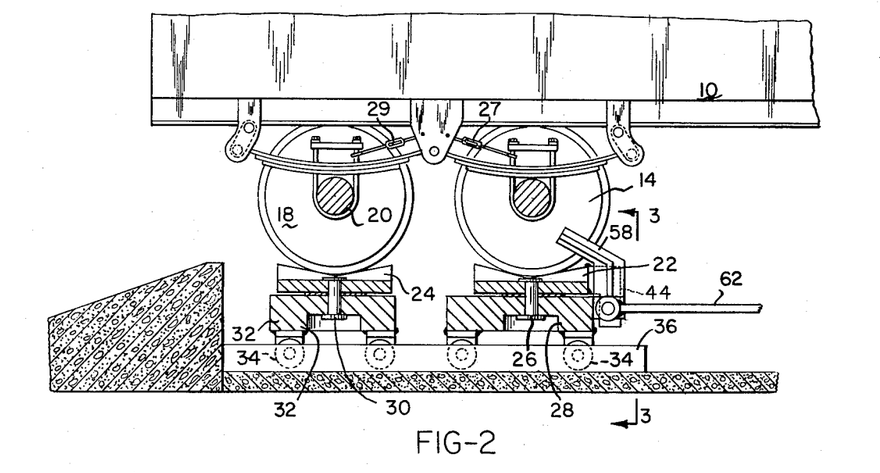
FIGURE 2 is a view drawn in enlarged scale and in the form of longitudinal section through the rear portion of the trailer and the alignment device of the present invention.
Figure 3:
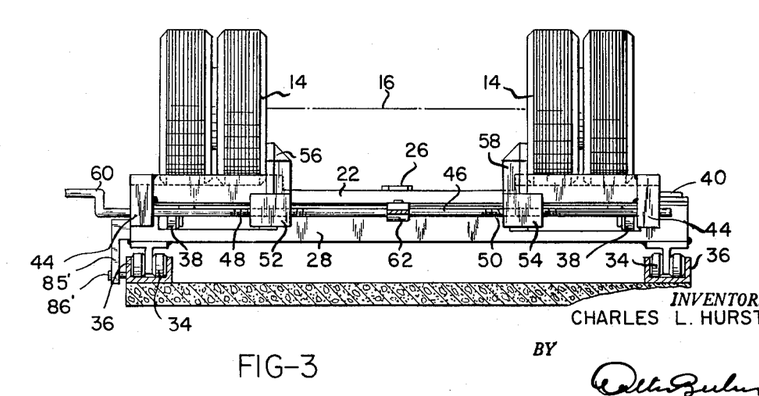
FIGURE 3 is a vertical sectional view indicated by line 3—3 on FIGURE 2 looking rearwardly toward the alignment device.

In the operation of the above described embodiment, the trailer is drawn into its FIGURE 1 position with the wheels of the axles resting on the V blocks. The V blocks are then loosened from their clamped positions and, also, the support blocks are loosened from their clamped positions. The V blocks are checked to make certain that the tires are properly centered thereon and it will be noted at this time that the centering of the wheels in the V blocks is accurate on accounut of the wide angles of the V's.

The crank 60 is now availed of to rotate rod 46 thereby to bring arms 56 and 58 outwardly into engagement with the running gear of the trailer and, specifically, the insides of the tires on the front axle. The bar 80 is now connected with the trailer king pin and the cable 76 is drawn up taut. Inasmuch as bar member 62 projects forwardly at right angles to the front axle of the trailer and in alignment with the mid point thereof, if the axle is out of alignment, the gauge consisting of scale 70 and pointer 72 will give a reading other than zero.

If adjustment of the axle is required, it is loosened at one end and the pertaining turnbuckle adjusting means 27 is utilized to shift the adjacent end of the axle in the proper direction the required amount. If no turnbuckle means is provided the axle can be moved by some sort of jack, or by driving to adjust it the desired amount. During this adjusting operation, the wheel is maintained in the V and the movable support platform is at this time effective for preventing the wheels from climbing up either side of their respective V's.

Any fore and aft movement of the support block 28 at this time is compensated for by the spring 78 so that cable 70 remains taut.

After the front axle has been adjusted so that the indicator made up of scale 70 and pointer 72 reads zero, the axle is aligned and can be clamped in place.

With the first described modification, when the front axle has been aligned, the second axle can be brought into parallelism therewith by loosening one end of the rear axle and adjusting it angularly until the reading of the pointer 40 on scale 42 for the rear V block is the same as the reading of pointer 40 on scale 42 for the front V block.

Alternatively, the trailer can be shifted forwardly to bring the rear wheels on top of the front V block, and the same operation carried out and the desired alignment will be obtained in this manner.

*Second Embodiment*

In the second embodiment, shown in FIGURES 10 through 14, bar 100 is mounted under the trailer body and is provided with a central aperture 101. The bar receives the apex of the triangular frame 102 which is pinned to the aperture by pin 103. The forward ends of the legs of frame 102 support a lateral bar 104 on which are slideably supported blocks 105. Rods 106 are fixed in the blocks and have their inner ends oppositely threaded and engaged by a nut 107 rotatably mounted in the center of bar 104. Suitable guides support blocks 105 on bar 104 so that rotation of nut 107 will move the blocks in and out to align them with predetermined corresponding points at opposite ends of the front axle 108 of the trailer. Each block carries a support arm 109 adapted for resting on the cylindrical member extending between the tires. Each block also carries a sleeve 110.

Figure 10:
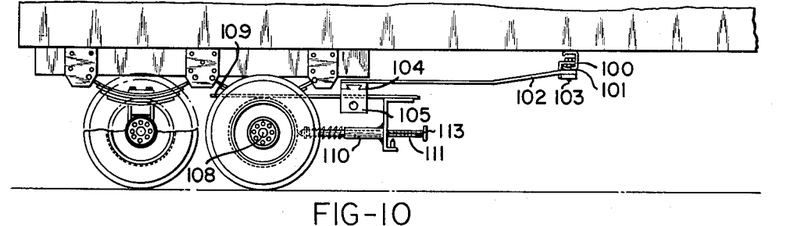
FIGURE 10 is a view similar to FIGURE 1, but showing a modified wheel and axle alignment device according to the present invention which can be utilized for checking wheel and axle alignment any place that the trailer is on a flat surface.
Figure 11:
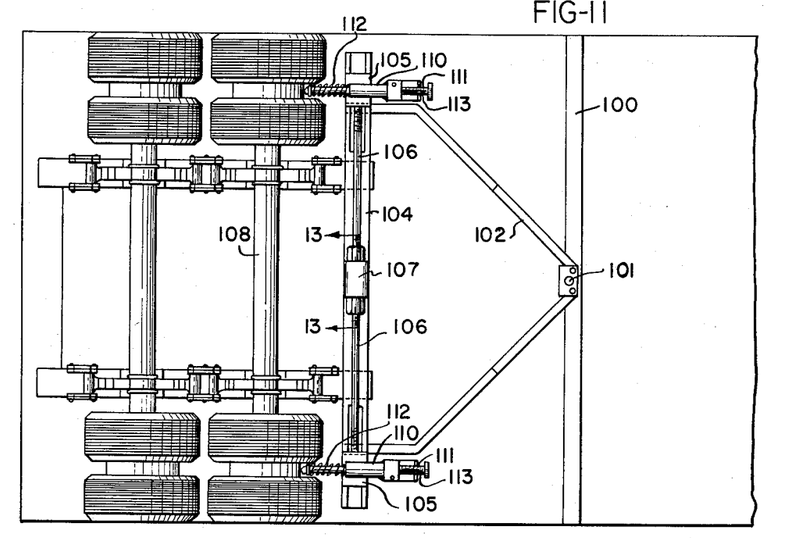
FIGURE 11 is a view looking up from beneath FIGURE 10.
Figure 12:
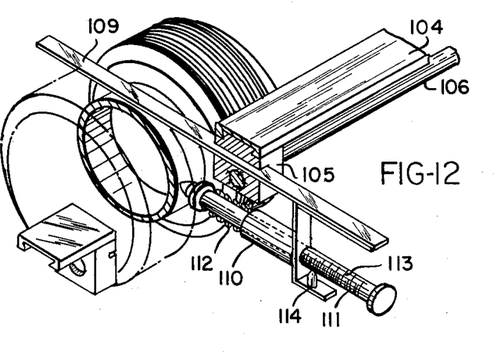
FIGURE 12 is a perspective view showing part of the modification of FIGURES 10 and 11.

There is a plunger 111 urged by a spring 112 toward the said cylindrical member. The plungers have scales 113 thereon movable past pointers 114. When the scale readings on the plungers are different, the axle is out of alignment and must be adjusted as described above until the said readings are identical which indicate, by simple triangulation, that the axle is properly aligned with a reference line extending at right angles from the center of the axle forwardly to the aperture 101, and which line, if extended, would pass through the king pin of the trailer.

It will be understood, of course, the frame 102 must be supported accurately and this can either be accomplished by the support arms 109 fitting closely between the tires, or by other clamp means engaging the sides of the tires, or by making the frame rigid with bar 100 when mounted therein.

Figures 13, 14:
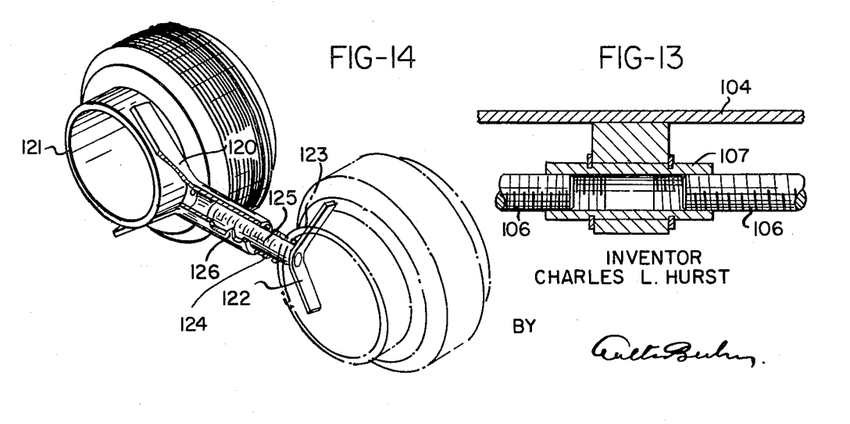
FIGURE 13 is a sectional view indicated by line 13—13 on FIGURE 11.
FIGURE 14 is a perspective view showing a device that can be employed by aligning one of a pair of tandem trailer wheels by reference to the other thereof.
Figure 13A:
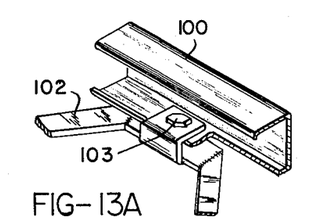
FIGURE 13A is fragmentary view showing a connection between two parts of the alignment device.

For adjusting the rear axle in connection with the second embodiment, the device of FIGURE 14 may be employed. This device comprises two telescopically interconnected members having Y-shaped ends and being spring urged apart. A first member 120 engages the cylindrical portion 121 between the wheels of the rear axle and a second part 122 engages cylindrical portion 123 between the wheels of the front axle. A spring 124 urges the members apart so a scale 125 on one part gives an indication relative to pointer 126 of the other part that will show the spacing between the pertaining ends of the axles.

Placing one of the described devices between the axles at each end after the front axle has been aligned, permits alignment of the rear axle by adjusting the angularity until the scale readings of the two devices are the same, thus showing that the rear axle is parallel with the front axle.

Third Embodiment

In a third embodiment of the present invention, illustrated in FIGURES 15 through 19, accurately located gauge members are fixed to at least the front axle and are utilized for aligning purposes.

Figure 15:
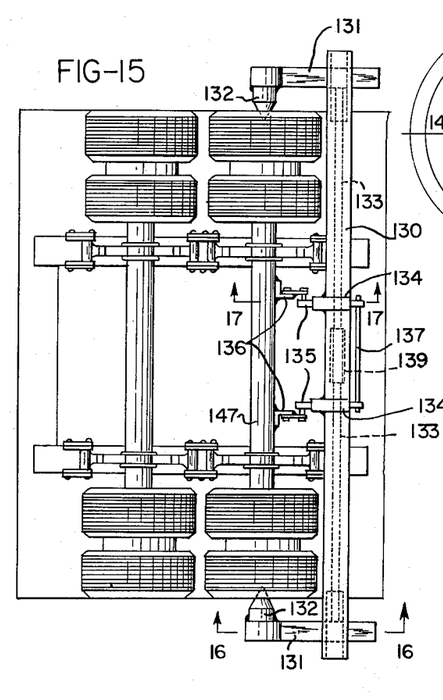
FIGURE 15 is a more or less diagrammatic plan view showing still another modification of the present invention, in particular, illustrating a fixture for applying gauge members to one of the trailer axles for use in alignment thereof.
Figure 16:
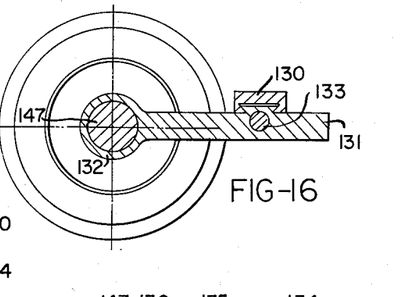
FIGURE 16 is a sectional view indicated by line 16—16 on FIGURE 15.
Figure 17:
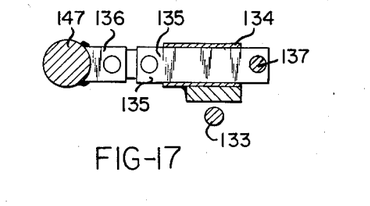
FIGURE 17 is a sectional view indicated by line 17—17 on FIGURE 15.

FIGURES 15 through 17 show a fixture that can be utilized for rotating the gauge members on the axle. This fixture comprises a bar member 130 having arms 131 guided thereon for sliding movement and extending rearwardly therefrom carrying centers 132 adapted for engagement with the centers of the axle by movement of the arms inwardly on the bar which can be accomplished by the turnbuckle arrangement consisting of a nut 139 and rods 133 threaded therein and connected with the arms.

Accurately located on bar 130 is a pair of sleeves 134 having slideable plungers 135. These plungers are connected by a rod 137 so that they move together. At their axle ends, plungers 135 have means for supporting gauge members 136. These gauge members are accurately located by the fixture and, while supported by the fixture, are secured to the axle. Thereafter, the fixture is removed leaving the gauge members in place on the axle.

Figure 18:
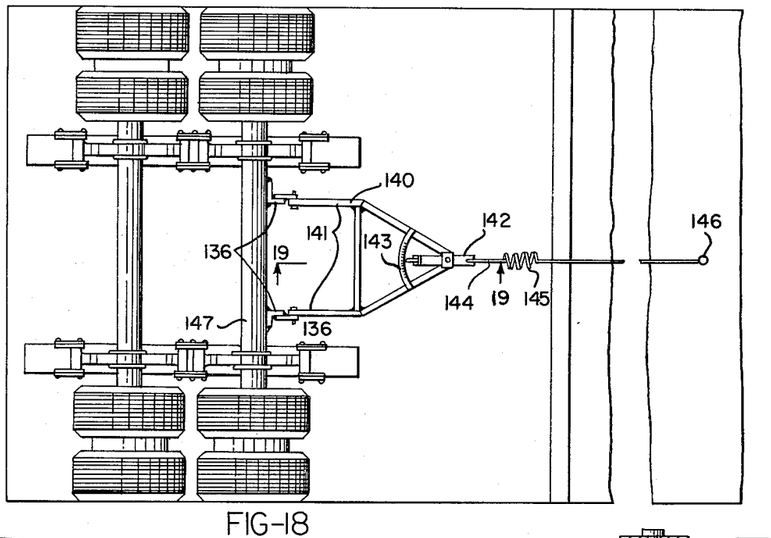
FIGURE 18 is a view looking up from beneath a trailer with an alignment device mounted on the trailer and utilizing the gauge members applied to the axle by the fixture of FIGURE 15.
Figure 19:
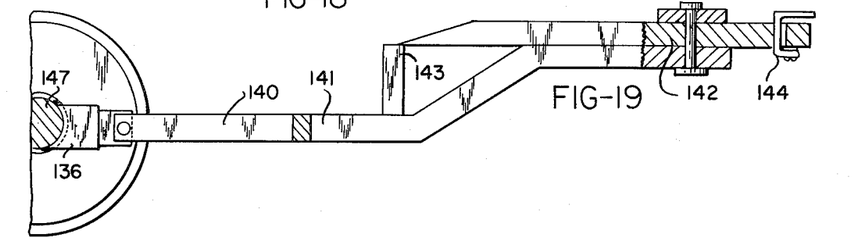
FIGURE 19 is a longitudinal sectional view drawn on somewhat enlarged scale and is indicated by line 19—19 on FIGURE 18.

These gauge members are employed with an aligning device illustrated in FIGURES 18 and 19 and which consists of a frame 140 having two legs 141 adapted for connection with the gauge members 136. At the front of frame 140 is pivotally connected a pointer arm 142 that sweeps a scale 143 on the frame. The front end of arm 142 has connected thereto a cable 144 that has a spring 145 therein and which cable leads forwardly to be connected with king pin 146 of the trailer, for example, by means of an angular bar.

It will be evident that drawing cable 144 taut will cause pointer 142 to deflect from a zero position if axle 147 is out of alignment. The axle, if out of alignment, can be adjusted as described above, thereby to bring reading of pointer 142 to zero.

The rear axle, if the trailer has tandem axles, can be aligned by any of the methods previously described, or by the same aligning procedure described in connection with the front axle, if the rear axle is provided with gauge members thereon.

From the foregoing it will be apparent that the present invention provides a relatively simple but highly accurate manner of aligning the axles of trailers and for both single axle and tandem axle construction. Various modifications have been illustrated but all are based on the principle of establishing a reference line passing through the king pin of the trailer and the center of the axle to be aligned, and adjusting the axle into a position of right angles to the reference line.

The same advantage obtains in the practice of any of the modifications that the trailer wheels will track precisely behind the tractor wheels thus eliminating side slip on both the trailer and tractor wheels and thereby eliminating any unnecessary tire wear.

The installation of an axle alignment checking station according to the present invention is relatively inexpensive and simple and the operation of the station, once installed, is convenient and rapid.

Figure 20:
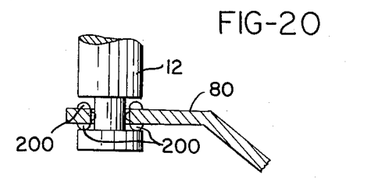
FIGURE 20 is a fragmentary view showing the manner in which a floating connection can be established between the trailer king pin and the bar forming a portion of the reference line means on the trailer so that the bar will not be tilted laterally by any angularity of the king pin.

Inasmuch as the king pin of the trailer might have some slight angularity which would interfere with the positioning of bar 80, the arrangement of FIGURE 20 is preferred wherein it will be seen that bar 80 has a floating connection with king pin 12 by loosely embracing the pin and having means such as the round projections 200 which will give the bar point engagement with the king pin thus permitting the bar to take a true position when the cable attached thereto is drawn taught.

Figure 21:
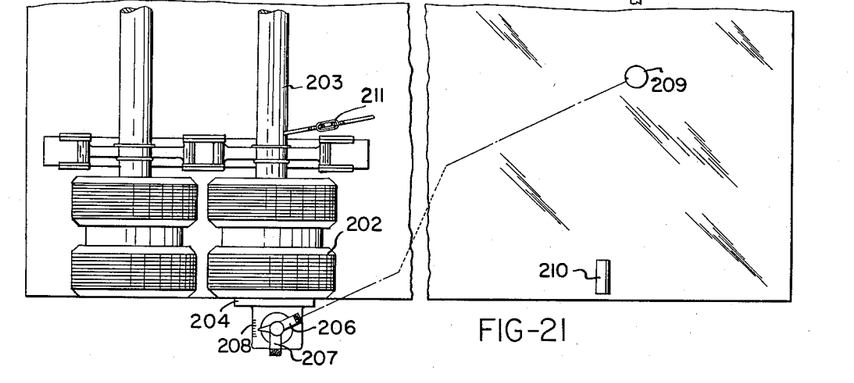
FIGURE 21 is a rather diagrammatic plan view showing an axle aligning arrangement according to this invention in which a device is attached to one trailer wheel, preferably to the end of the axle which is adjustable and which device establishes an optical reference line from the wheel to the predetermined point on the trailer.
Figure 22:
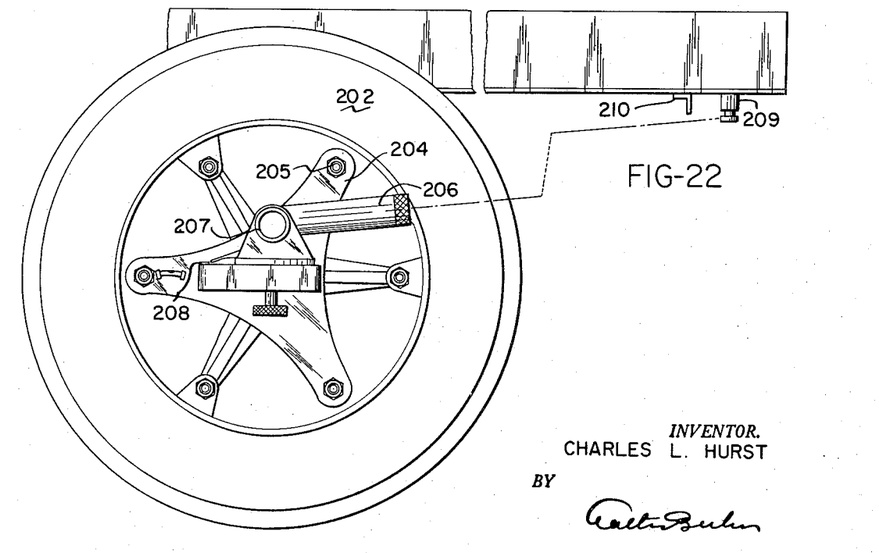
FIGURE 22 is a diagrammatic side view of the arrangement of FIGURE 21 showing how the device is attached to the wheel of the trailer.

FIGURES 21 and 22 show a modification wherein a device is attached to one of the wheels 202 of the trailer axle 203 that is to be aligned. This device consists of a frame 204 which may be atached to three of the wheel studs 205, for example, or attached to the wheel in any other manner so as to have a fixed relationship to the wheel, and, therefore, to the axle to be aligned. This device or frame, has movably mounted thereon a transit or telescope 206 having an eye piece 207. The transit or telescope is rotatable on the frame and its exact angular position is designated by the scale means 208. This telescope or transit is utilized for sighting either the king pin 209, or another reference means, such as a scribe mark on a member 210 attached to the trailer in fixed relation to the king pin. By taking a reading on either the king pin or the line on reference number 210, the angularity of the axle can be determined and adjusted if necessary, the turnbuckle means being availed of for this purpose.

The modification of FIGURES 21 and 22 employs the same principle as the previously described modifications in that a reference line means is established leading from the axle, and this reference line is related to another reference means on the trailer, which may be a line or a point bearing a fixed relation to the longitudinal axis of the trailer.

Figure 23:
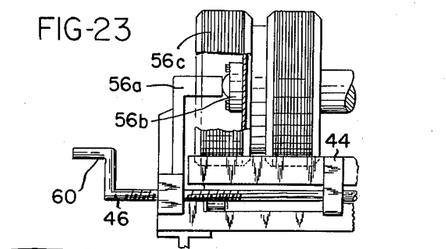
FIGURE 23 is a fragmentary view showing a different manner of fixing the reference frame relative to the axle to be checked and aligned.

FIGURE 23 shows a modification of the first modification. In the first described modification arms 56 engage the insides of the tires on the axle to be aligned. In FIGURE 23 the arms, indicated at 56a engage the hubs 56b of the wheels 56c and thus align the frame with the axle. The hubs are accurately machined and this provides for accurate location of the reference frame.

Figure 24:
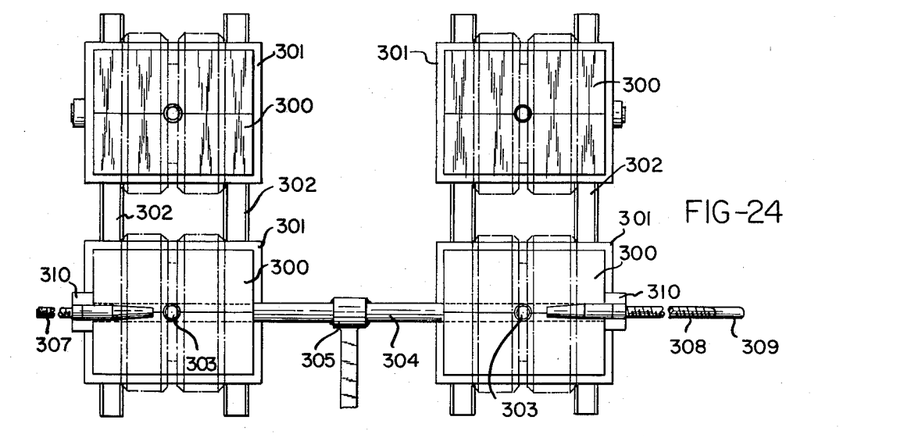
FIGURE 24 is a more or less diagrammatic plan view of still another modified arrangement of the present invention.
Figure 25:
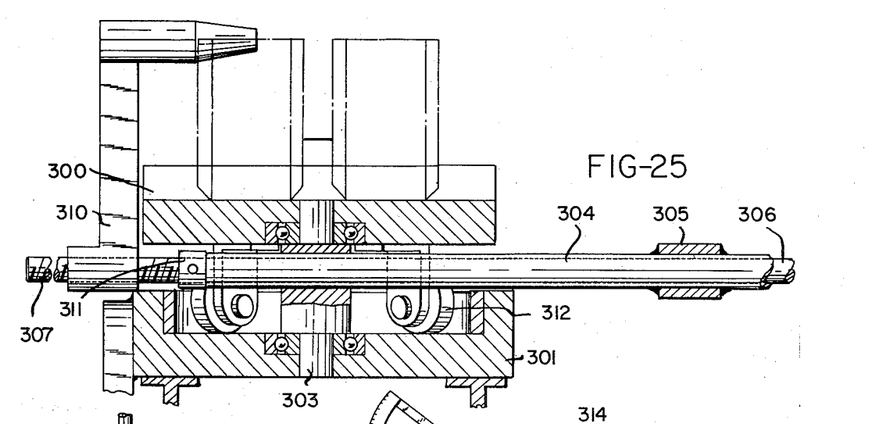
FIGURE 25 is a vertical sectional view through one of the front V blocks of FIGURE 24.
Figure 26:
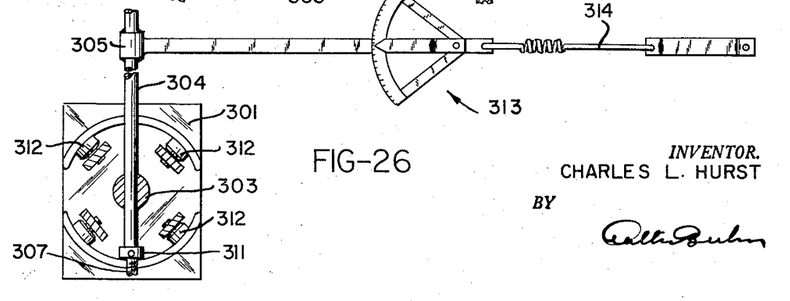
FIGURE 26 is a somewhat diagrammatic plan view showing the manner in which the gauge is attached to the reference frame of FIGURES 24 and 25.

FIGURES 24 through 26 show a modified and improved arrangement which is similar to the first described modification. In this improved modification there are provided individual V blocks 300 for the several wheels of the trailer. These blocks rest on the support blocks 301 that are movable in the fore and aft direction on tracks 302. Pivot pins 303 connect V blocks 300 with support members 301. This arrangement takes into account the possibility that the individual trailer wheels may be out of round or a tire may have a bump thereon which would interfere with the locating of the large V block members of the first modification. The individual members, however, will take a true position even if the tires do have bumps so that a line extending between the centers of the V blocks will be parallel with the axle.

This line is provided by extending a tube 304 through the centers of pivot posts 303. This tube has the reference bar 305 fixed to the center thereof. Inside tube 304 is rotatably mounted rod 306 having oppositely threaded end parts 307 and 308. A crank 309 can be availed of for rotating rod 306 so that the shoes 310 thereon will move inwardly and engage the wheel hubs of the running gear of the trailer at the opposite ends of the axle. Collars 311 fixed to rod 306 at opposite ends of tube 304 hold the tube on the rod against axial movement thereon so that when the rod is centered by engagement of the wheel hubs of the trailer running gear with the shoes 310, the tube 304 will also be centered and this will center bar 305 which is the reference bar.

To relieve pivot post 303 from as much load as possible, the V blocks 300 are carried on rollers 312 that permit free pivoting of the V blocks to adjust to the trailer wheels.

As will be seen in FIGURE 26, the bar 305 cooperates with an indicator 313 and a cable 314 leading forwardly to a fixed reference point on the tractor in the same manner as has been described previously.

The rear wheels of the trailer, when it has tandem axles, can be aligned in the last mentioned modification, by incorporating in the rear set of V blocks, the same mechanism as has been described in connection with the front set of V blocks. Also, gauge means could be provided to indicate the angularity of rod 306 relative to one of the supports 301 pertaining to the front set of wheels, and a corresponding gauge pertaining to the corresponding block 301 pertaining to the rear wheels and a bar extending through the pivot axis of the rear pivot pins 303 could be utilized in the same manner as has previously been described to set the rear axle into parallelism with the front axle.

Still further, a device according to FIGURE 14 could be employed for adjusting the rear axle into parallelism with the front axle after the latter had been adjusted.

It is to be understood that the present invention is subject to considerable modification to adapt it to various circumstances and it is intended that such modifications as fall within the scope of the appended claims are intended to come within the purview of the present invention.

I claim:

1. A device for checking the alignment of the axles of trailers comprising: a frame adapted for being fixedly located relative to the trailer axle comprising a member extending substantially horizontally at right angles to the axle to be aligned at the midpoint thereof, a cable extending from the end of said member opposite the axle to a forwardly located central point on the trailer, and an indicator connected between the cable and the member operable to indicate angularlity therebetween to determine the angle of the axle to be aligned with regard to the longitudinal axis of the trailer, said frame comprising laterally movable elements equidistantly located on opposite sides of said member, and means for moving said locating members in unison in respectively opposite directions for engagement with the running gear on said axle to locate said member centrally therebetween.

2. In a trailer axle aligning device; a wheel supporting platform having V formations to receive laterally extending wheels of the running gear of a trailer, a support platform beneath the wheel supporting platform, means pivotally interconnecting said platforms on a vertical axis in the region of the center thereof, means supporting said support platform for fore and aft movement in parallelism with itself, said platforms being adapted for being held stationary while the wheels of a trailer are being drawn into the V formations of the wheel supporting platform and thereafter being released, locating members carried by said wheel supporting platform movable in respectively opposite directions to engage the sides of the trailer running gear having the wheels thereof on said wheel supporting platform, a member centrally located between said locating members and extending forwardly of the trailer at right angels to the transverse axis of said V formations, an indicator element pivotally connected to the forward end of said member, a cable attached to said indicator element adapted for connection with the king pin of said trailer, a scale on said frame relative to which the indicator is movable whereby when the cable is drawn taut, any angularity between said member and said cable will be indicated on said scale, and indicator means between said platforms to indicate the degree of adjustment of the wheel supporting platform about its pivotal connection with said support platform after the trailer axle has been loosened to adjust the axle into a position of right angles relative to the longitudinal axis of the trailer.

3. In a trailer axle aligning device: a wheel supporting platform having laterally extending V formations to receive a laterally spaced pair of the wheels of the running gear in a first axle of a trailer, a support platform beneath the wheel supporting platform, means pivotally interconnecting said platforms on a vertical axis in the region of the center thereof, means supporting said support platform for fore and aft movement in parallelism with itself, said platforms being adapted for being held stationary while the wheels of a trailer are being drawn into the V formations of the wheel supporting platform and thereafter being released, locating members carried by said wheel supporting platform movable in respectively opposite directions to engage the sides of the trailer running gear having the wheels thereon on said wheel supporting platform, a member centrally located between said locating members and extending forwardly of the trailer at right angles to the transverse axis of said V formations, an indicator element pivotally connected to the forward end of said member, a cable attached to said indicator element adapted for connection with the king pin of said trailer, a scale on said frame relative to which the indicator is movable whereby when the cable is drawn taut, any angularity between said member and said cable will be indicated on said scale, and the indicator means between said platform to indicate the degree of adjustment of the wheel supporting platform about its pivotal connection with said support platform after the trailer axle has been loosened to adjust the axle into a position of right angles relative to the longitudinal axis of the trailer, a second support platform supported in back of the first mentioned support platform for fore and aft movement, a second wheel supporting platform pivotally mounted on a vertical axis thereon also having V formations in the upper surface to receive a second laterally spaced pair of wheels of the trailer running gear on a second axle of a tandem axle trailer, and indicator means between said second support platform and the wheel supporting platform thereon so the pertaining axle can be adjusted into parallelism with the first mentioned axle and its wheel supporting platform by availing of said indicator means.

4. In a trailer axle aligning device: a wheel supporting platform having laterally extending V formations to receive the wheels of the trailer running gear on the front axle of a tandem axle trailer, a support platform beneath the wheel supporting platform, means pivotally interconnecting said platforms in the region of the center thereof, means supporting said support platform for fore and aft movement in parallelism with itself, said platforms being adapted for being held stationary while the wheels of a trailer are being drawn into the V formations of the wheel supporting platform and thereafter being released, locating members carried by said wheel supporting platform movable in respectively opposite directions to engage the sides of the trailer running gear having the wheels thereof on said wheel supporting platform, a member centrally located between said locating members and extending forwardly of the trailer at right angels to the transverse axis of said V formations, as indicator element pivotally connected to the forward end of said member, a cable attached to said indicator element adapted for connection with the king pin of said trailer, a scale on said frame relative to which the indicator is movable whereby when the cable is drawn taut, any angularity between said member and said cable will be indicated on said scale, and the indicator means between said platforms to permit adjustment of the wheel supporting platform about its pivotal connection with said support platform after the trailer axle has been loosened to adjust the axle into a position of right angles relative to the longitudinal axis of the trailer, a second support platform supported in back of the first mentioned support platform for fore and aft movement, and a second wheel supporting platform pivotally mounted thereon also having V formations in the upper surface to receive the wheels of the trailer running gear on the rear axle of the trailer, and indicator means between said second platforms so the second wheel supporting platform and its pertaining axle can be adjusted into parallelism with the first mentioned wheel supporting platform and its pertaining axle, said cable being provided with a resiliently extensible link therein.

5. In a device for checking the alignment of a trailer axle: spaced V blocks adapted for receiving the wheels of the trailer running gear pertaining to the axle to be aligned, means supporting said V blocks for movement in the fore and aft direction of the trailer and also for pivotal movements about vertical axes, a member extending between said blocks in the plane of the vertical pivot axis of said blocks, means on said member engageable with the said running gear at opposite ends of said axle for locating said member relative to the axle, and means attached to said member operable for establishing reference line means bearing a fixed relationship to said member.

6. In a device for checking the alignment of a trailer axle: spaced V blocks for receiving the wheels of the trailer running gear pertaining to the axle to be aligned, means supporting said V blocks for movement longitudinally of the trailer and for pivoting movement on vertical axes, a rod member extending transversely of the trailer and through said axes of pivotal movement of the V blocks, said rod member having oppositely threaded ends, shoes threaded to the ends of said rod member whereby rotation of the rod will move the shoes into engagement with the said running gear and thereby locate said member in a fixed position relative to the axle, and means connected with the rod member at a predetermined point operable for establishing reference line means bearing a fixed relation to said rod member and therefore, to said axle whereby the angularity of the axle can be determined by measuring the position of said reference line means relative to other reference means on the trailer.

7. In a device for checking the alignment of trailer axles: spaced V blocks adapted for receiving the wheels of the trailer running gears pertaining to the axle to be checked, support blocks supporting said V blocks and individually movable longitudinally of the trailer, vertical pivot pins connecting the centers of the V blocks with the support blocks, a tube extending laterally through said pivot pins, a rod extending through the tube, collars on the rod at opposite ends of the tube, the opposite ends of said rod being oppositely threaded and shoes thereon movable into engagement with the said running gear upon rotation of said rod, and a reference member connected to said tube for indicating the angularity thereof relative to the longitudinal axis of the trailer and, therefore, also indicating the angularity of the said axle relative to the longitudinal axis of the trailer.

8. In a device for checking the alignment of trailer axles: spaced V blocks adapted for receiving the wheels of the trailer running gear pertaining to the axle to be checked, support blocks supporting said V blocks and individually movable longitudinally of the trailer, vertical pivot pins connecting the centers of the V blocks with the support blocks, a tube extending laterally through said pivot pins, a rod extending through the tube, collars on the rod abutting opposite ends of the tube, the opposite ends of said rod being oppositely threaded and shoes thereon movable into engagement with the said running gear upon rotation of said rod, and a reference member connected to said tube for indicating the angularity thereof relative to the longitudinal axis of the trailer and, therefore, also indicating the angularity of the said axle relative to the longitudinal axis, a second set of V blocks behind the first mentioned set of V blocks for receiving and supporting the wheels of the running gear pertaining to a second and rearwardly positioned axle of a tandem axle trailer when the wheels pertaining to the front axle of the trailer are supported on the first mentioned V blocks, and said second set of V blocks having individual support blocks therebeneath movable individually in the longitudinal direction of the trailer and also supporting said second set of V blocks for pivotal movement about central vertical axes.

References Cited in the file of this patent

UNITED STATES PATENTS

| | | |
|---|---|---|
| 2,167,361 | Haucke | July 25, 1939 |
| 2,275,137 | Friestedt | Mar. 3, 1942 |
| 2,479,723 | Brown | Aug. 23, 1949 |
| 2,590,722 | Otis | Mar. 25, 1952 |
| 2,845,718 | Keymer | Aug. 5, 1958 |